(12) United States Patent
Iwamoto et al.

(10) Patent No.: US 10,486,387 B2
(45) Date of Patent: Nov. 26, 2019

(54) PACKAGE FOR STORAGE UNDER LOW TEMPERATURE ENVIRONMENT AND METHOD USING SAME

(71) Applicant: TOYO SEIKAN GROUP HOLDINGS, LTD., Tokyo (JP)

(72) Inventors: Shinya Iwamoto, Yokohama (JP); Yosuke Akutsu, Yokohama (JP); Kota Okamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/780,292

(22) PCT Filed: Dec. 1, 2015

(86) PCT No.: PCT/JP2015/083779
§ 371 (c)(1),
(2) Date: May 31, 2018

(87) PCT Pub. No.: WO2017/094123
PCT Pub. Date: Jun. 8, 2017

(65) Prior Publication Data
US 2018/0346195 A1    Dec. 6, 2018

(51) Int. Cl.
*B32B 1/02* (2006.01)
*B65D 1/02* (2006.01)
(Continued)

(52) U.S. Cl.
CPC .................. *B32B 1/02* (2013.01); *B32B 1/08* (2013.01); *B32B 27/16* (2013.01); *B32B 27/32* (2013.01);
(Continued)

(58) Field of Classification Search
CPC .. B32B 1/02; B32B 1/08; B32B 27/16; B32B 27/32; B32B 27/327; B32B 27/34;
(Continued)

(56) References Cited

U.S. PATENT DOCUMENTS

2013/0032316 A1    2/2013   Dhiman et al.
2013/0034695 A1    2/2013   Smith et al.
(Continued)

FOREIGN PATENT DOCUMENTS

EP    1 279 359 B1    5/2005
EP    2 851 636 B1    11/2016
(Continued)

OTHER PUBLICATIONS

International Search Report of PCT/JP2015/083779 dated Feb. 23, 2016 [PCT/ISA/210].
(Continued)

*Primary Examiner* — Walter Aughenbaugh
(74) *Attorney, Agent, or Firm* — Sughrue Mion, PLLC

(57) ABSTRACT

A package for low temperature storage includes a container accommodating fluid contents, and is stored under a low temperature environment at 10° C. or lower. A lubricating layer derived from a slip improving agent is formed on the inner surface of the container. The fluid contents are in contact with the lubricating layer. When the storage environment temperature of the package is t° C. and the cloud point of the slip improving agent is c° C., the following condition: t<c+30 is satisfied.

5 Claims, 4 Drawing Sheets

(51) Int. Cl.
*B32B 27/16* (2006.01)
*B32B 1/08* (2006.01)
*B32B 27/32* (2006.01)
*B32B 27/34* (2006.01)
*B32B 27/36* (2006.01)
*B65D 23/02* (2006.01)
*B65D 1/00* (2006.01)
*B65D 85/72* (2006.01)
*B65D 23/00* (2006.01)

(52) U.S. Cl.
CPC ............ *B32B 27/327* (2013.01); *B32B 27/34* (2013.01); *B32B 27/36* (2013.01); *B65D 1/00* (2013.01); *B65D 1/0207* (2013.01); *B65D 1/0215* (2013.01); *B65D 23/00* (2013.01); *B65D 23/02* (2013.01); *B65D 85/72* (2013.01)

(58) Field of Classification Search
CPC . B32B 27/36; A23L 3/36; A23L 3/363; A23L 3/364; B65D 1/0207; B65D 1/0215
See application file for complete search history.

(56) References Cited

U.S. PATENT DOCUMENTS

| | | |
|---|---|---|
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2015/0108032 A1 | 4/2015 | Akutsu et al. |
| 2016/0039557 A1 | 2/2016 | Akutsu et al. |
| 2016/0075117 A1 | 3/2016 | Akutsu et al. |
| 2017/0043372 A1 | 2/2017 | Iwamoto et al. |
| 2017/0144783 A1 | 5/2017 | Komatsu et al. |

FOREIGN PATENT DOCUMENTS

| | | |
|---|---|---|
| JP | 57-165491 A | 10/1982 |
| JP | 6-345903 A | 12/1994 |
| JP | 2009-113866 A | 5/2009 |
| JP | 2012-254255 A | 12/2012 |
| JP | 2013-242058 A | 12/2013 |
| JP | 2014-231231 A | 12/2014 |
| JP | 5673905 B1 | 2/2015 |
| JP | 2015-168471 A | 9/2015 |
| WO | 2010/103985 A1 | 9/2010 |
| WO | 2012/100099 A2 | 7/2012 |
| WO | 2013/022467 A2 | 2/2013 |
| WO | 2014/010534 A1 | 1/2014 |
| WO | 2015/159643 A1 | 10/2015 |
| WO | 2015/163189 A1 | 10/2015 |

OTHER PUBLICATIONS

Communication dated Apr. 9, 2019, from the Japanese Patent Office in counterpart Appl. No. 2018-111595.

PACKAGE FOR STORAGE UNDER LOW TEMPERATURE ENVIRONMENT AND METHOD USING SAME

CROSS REFERENCE TO RELATED APPLICATIONS

This application is a National Stage of International Application No. PCT/JP2015/083779, filed Dec. 1, 2015.

TECHNICAL FIELD

This invention relates to a package comprising a container accommodating fluid contents. More specifically, the invention relates to a package for low temperature storage which is stored under a low temperature environment and, when used, is taken out from under the low temperature environment.

BACKGROUND ART

Plastics are easy to mold, and can be easily molded into various shapes. Thus, they are put to wide varieties of uses. In particular, bottles in which the inner surfaces of container walls are formed from polyesters typified by polyethylene terephthalate (PET) are used preferably as containers for accommodating various beverages, edible oils, seasoning liquids, etc.

Bottles for accommodating highly viscous liquids, in particular, are required to exhibit high slip properties on the inner surface of the bottle with respect to liquid contents so that the contents can be discharged promptly and can be used up completely without being left within the bottle.

Recently, various proposals have been made for technologies which enhance slip properties with respect to viscous substances by forming a liquid layer on a resinous surface of a base material (for example, Patent Documents 1, 2).

According to such technologies, the slip properties can be enhanced dramatically as compared with the incorporation of an additive, such as a lubricant, into the resin forming the surface of the base material. Currently, therefore, these technologies are attracting attention.

With the above means for modifying the surface characteristics by forming the liquid layer on the resinous surface, however, the problem arises that it is difficult to sustain the modified surface characteristics for a long term. That is, the liquid forming the liquid layer gradually permeates and diffuses into the underlying resin layer. As a result, the modified surface characteristics disappear over time.

Patent Document 3 by the present inventors proposes that a liquid diffusion preventive layer for preventing the permeation/diffusion of the liquid be provided on the underside of the underlying resin layer under the liquid layer on the inner surface of the container in order to preclude the disappearance over time of the surface characteristics attributed to the liquid layer as mentioned above.

Patent Document 4 proposes a packaging material comprising a composition having an additive with HLB of 5.0 or less incorporated in a range of 0.3 to 3 parts by weight into 100 parts by weight of a polyolefin resin.

The packaging material of Patent Document 4 is excellent in releasability from emulsion-based contents such as chocolate cream or custard cream. That is, such emulsion-based contents minimally adhere to the packaging material, thus avoiding, for example, the disadvantage that the contents deposit in a large amount on the inner surface of a lid material.

Researches by the present inventors, however, have shown that a container formed from such a composition is insufficient to enhance slip properties with respect to fluid contents such as ketchup.

PRIOR ART DOCUMENTS

Patent Documents

Patent Document 1: WO2012/100099
Patent Document 2: WO2013/022467
Patent Document 3: Japanese Patent No. 5673905
Patent Document 4: JP-A-H6-345903

SUMMARY OF THE INVENTION

Problems to be Solved by the Invention

An object of the present invention is, therefore, to provide a package of a novel structure, which comprises a container accommodating fluid contents and has a layer of a slip improving agent formed on the inner surface of the container, wherein the slip improving agent layer exhibits excellent slip properties with respect to the fluid contents and is held stably, and a decline in the slip properties over time is effectively suppressed; and a method for using the package.

Means for Solving the Problems

According to the present invention, there is provided a package for low temperature storage which comprises a container accommodating fluid contents, and which is stored under a low temperature environment at 10° C. or lower, wherein a lubricating layer derived from a slip improving agent is formed on the inner surface of the container, the fluid contents are in contact with the lubricating layer, and when the storage environment temperature of the package is t° C. and the cloud point of the slip improving agent is c° C., the following condition:

$$t < c + 30$$

is satisfied.

In the package of the present invention, it is preferred that
(1) the lubricating layer derived from the slip improving agent should have a coating amount of 0.2 to 50 g/m² at room temperature (23° C.),
(2) the inner surface of the container underlying the lubricating layer be formed from a resin,
(3) the resin forming the inner surface of the container be formed from an olefin resin having a glass transition point (Tg) of 0° C. or lower,
(4) the following condition:

$$t < c$$

where t and c have the aforementioned meanings be further satisfied.
(5) the cloud point of the slip improving agent be −20° C. to 10° C., and
(6) the container should have a multilayer structure having a resin layer in the inner surface, and the coating amount of the lubricating layer derived from the slip improving agent be larger than the saturated impregnation amount of the slip improving agent that the resin layer forming the inner surface has.

According to the present invention, there is also provided a method for using a package for low temperature storage, comprising:

storing the above package for low temperature storage under the low temperature storage environment at 10° C. or lower for a certain period;

then withdrawing the package from under the low temperature storage environment;

then heating the package to a temperature equal to or higher than the cloud point of the slip improving agent; and then discharging the fluid contents from inside the package.

In this method for use, the heating after withdrawal of the package from under the low temperature storage environment (i.e., heating to the temperature equal to or higher than the cloud point of the slip improving agent) liquefies the lubricating layer derived from the slip improving agent, thereby making it possible to discharge the fluid contents promptly from inside the package (inside the container).

In the present invention, the fluid contents refer to what, in a stationary state, does not cause shear stress parallel to a contact surface (namely, what does not require force when deformed). For example, the fluid contents do not include agar jelly-shaped ones such as certain types of yogurt or custard pudding, or ones retaining their shapes in a stationary state, such as cream, butter or cheese.

Effects of the Invention

The package of the present invention is stored under a low temperature environment at 10° C. or lower, and the lubricating layer resulting from the slip improving agent and formed on the inner surface of the container is formed to satisfy the following condition:

$$t < c + 30,$$

especially, $t \ll c$ where t is the storage environment temperature (° C.) of the package, and c is the cloud point (° C.) of the slip improving agent.

That is, with the package of the present invention, the package is cooled in the storage environment to a temperature close to the cloud point of the slip improving agent forming the lubricating layer (in particular, a temperature lower than the cloud point). As a result, the molecular mobility of the slip improving agent declines under the storage environment, and the permeation/diffusion of the slip improving agent into the inner surface of the container underlying the lubricating layer is effectively suppressed, so that the coating amount of the lubricating layer (slip improving agent) can be maintained. In withdrawing the contents from inside the package, therefore, the package is heated to a temperature equal to or higher than the cloud point of the slip improving agent to raise the molecular mobility. By so doing, the surface characteristics (water repellency and slipperiness) that the slip improving agent essentially has can be exhibited anytime. Hence, the contents can be discharged promptly without adhering to the inner surface of the package (container), and nearly all of the contents can be used.

The above-described modification effect of the lubricating layer on the surface characteristics of the inner surface of the container is the same as that obtained when a liquid layer (e.g., a liquid layer of an edible oil or the like) is formed on the resinous surface. With the present invention, however, the slip improving agent in liquid form is coated at room temperature (23° C.) on the inner surface to form the lubricating layer and, after fluid contents are filled into the container, the container is stored under a low temperature environment. That is, it suffices to form the lubricating layer by coating the inner surface with the slip improving agent in a minimum required amount set in consideration of the degree of a decrease in the lubricating layer due to the permeation/diffusion of the slip improving agent during a period between the step of filling the contents and the step of storing the package. A special treatment step for performing the intended function is unnecessary, and various production lines conformed to the shape of the container and the type of the contents are easily available.

During storage under the low temperature environment, moreover, the molecular mobility of the slip improving agent is lowered. Thus, the slip improving agent does not permeate or diffuse into the material forming the inner surface of the container (for example, resin). Nor does the slip improving agent disappear over time. Consequently, the surface characteristics attributed to the lubricating layer can be exhibited stably for a long term.

Since such characteristics are effectively used, hydrophilic viscous contents (e.g., ketchup or mayonnaise) are selected as fluid contents, and the container with such contents is stored under a proper low temperature environment where the molecular mobility of the lubricating layer (slip improving agent) is reduced, and the permeation/diffusion of the lubricating layer into the underlying inner surface of the container can be suppressed. By so doing, a sufficient coating amount of the slip improving agent can be maintained for a long term. At the time of use, slip properties with respect to the fluid contents can be promptly exhibited by heating. The contents can be discharged quickly without adhering to or remaining on the inner surface of the container. Besides, almost all of the fluid contents within the container can be used up. In particular, uses for discharging all the contents at a stretch, especially, commercial uses, are preferred.

MODE FOR CARRYING OUT THE INVENTION

Figure 1:
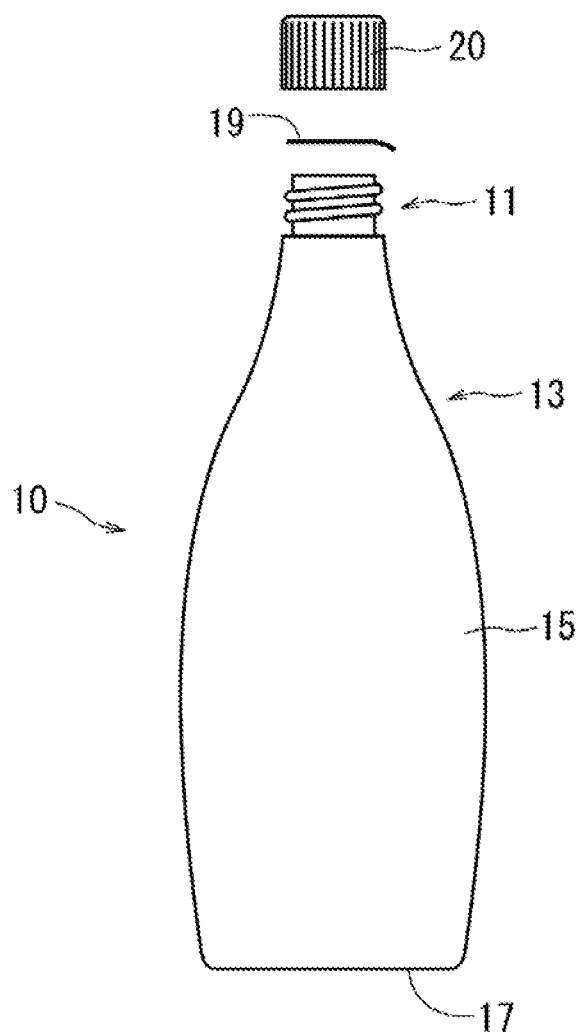
FIG. 1 is a view showing an example of a package according to the present invention, as an appearance drawing.

The package of the present invention comprises a container filled with fluid contents. This package has a basic structure in which a slip improving agent is coated on the inner surface of the container to form a lubricating layer, and the fluid contents are in contact with the lubricating layer.

1. Material for the Inner Surface of the Container:

With such a package, the material for forming the inner surface of the container underlying the lubricating layer is not particularly limited. Generally, however, the material is any moldable thermoplastic resin or thermosetting resin. In particular, the thermoplastic resin is preferred from the viewpoints that it is easy to mold, and can hold the lubricating layer stably without its detachment.

Such a thermoplastic resin can be exemplified by the following:

Olefin resins, for example, low density polyethylene, high density polyethylene, polypropylene, poly-1-butene, poly-4-methyl-1-pentene, random or block copolymers of α-olefins such as ethylene, propylene, 1-butene, and 4-methyl-1-pentene, and cyclic olefin copolymers;

Ethylene-vinyl copolymers, for example, ethylene-vinyl acetate copolymer, ethylene-vinyl alcohol copolymer, and ethylene-vinyl chloride copolymer;

Styrene resins, for example, polystyrene, acrylonitrile-styrene copolymer, ABS, and α-methylstyrene-styrene copolymer;

Vinyl resins, for example, polyvinyl chloride, polyvinylidene chloride, vinyl chloride-vinylidene chloride copolymer, polymethyl acrylate, and polymethyl methacrylate;

Polyamide resins, for example, nylon 6, nylon 6-6, nylon 6-10, nylon 11, and nylon 12;

Polyester resins, for example, polyethylene terephthalate (PET), polybutylene terephthalate, polyethylene naphthalate, and copolyesters thereof;

Polycarbonate resins;

Polyphenylene oxide resins; and

Biodegradable resins, for example, polylactic acids.

It goes without saying that as long as moldability is not impaired, blends of these thermoplastic resins can be used as underlying resins.

In the present invention, of the above-mentioned thermoplastic resins, olefin resins or polyester resins are preferably used. In particular, olefin resins are preferred, because they have high affinity for the slip improving agent forming the lubricating layer, show high wettability, and enable a uniformly thick lubricating layer to be formed on the entire inner surface of the container.

The above olefin resins, in particular, are low in glass transition point (Tg) (generally, 0° C. or lower), and high in molecular mobility at room temperature, as compared with polyester resins such as PET. When a liquid layer of an edible oil or the like is formed on the surface of the olefin resin, therefore, a liquid forming the liquid layer is apt to permeate and diffuse into the olefin resin, tending to cause disappearance of the liquid layer over time. With the present invention, however, the fluid contents are accommodated in the container, and the container is stored under a low temperature environment. Hence, even when the inner surface of the container is formed from such an olefin resin, the problem of the lubricating layer disappearing over time scarcely arises.

In the case of a commercial package having fluid contents accommodated within a large bag-shaped container, for example, the olefin resin is optimal as an inner surface resin.

2. Slip Improving Agent

As the slip improving agent for forming the lubricating layer, there is used a substance immiscible with the contents and becoming liquid when the contents are discharged. If miscible with the contents, the slip improving agent present on the inner surface of the container mixes with the contents and falls off the inner surface of the container.

As for the substance immiscible with the contents, it suffices that this substance does not mix with the contents and, roughly speaking, a lipophilic substance is used on aqueous contents, whereas a hydrophilic substance is used on oily contents. Generally, a substance, whose surface tension relative to the inner surface of the container differs greatly from that of the contents after the contents are filled into the container and then discharged, or the contents are selectively extracted and removed, has a higher lubricating effect, and is preferred for the present invention.

Furthermore, the slip improving agent preferably has a cloud point of −20° C. to 10° C. By cooling the slip improving agent in a liquid state to a temperature of the cloud point or lower, the molecular mobility of the slip improving agent lowers, and its component partly coagulates, so that the permeation of the slip improving agent into the resin can be suppressed for a long term.

Even if the temperature is the cloud point or higher, however, the permeation of the slip improving agent into the inner surface of the container (particularly, the interior of the resin) can be suppressed for a desired period of time, if the cloud point c (° C.) and the storage environment temperature t (° C.) satisfy the following condition:

$$t < c + 30$$

Particularly when the storage environment temperature satisfies the following condition:

$$t < c$$

the permeation of the slip improving agent during storage can be suppressed most effectively.

This is because the kinetic energy of the molecule of the liquid slip improving agent is reduced to a value equal to or lower than the energy value necessary for permeation/diffusion into the resin. Hence, a liquid with a cloud point of −20° C. to 10° C., when placed in an ordinary low temperature storage environment temperature region (refrigeration temperature region (10° C. or lower) or chilling temperature region (5° C. or lower), or even a freezing temperature region (−15° C. or lower)), can be inhibited from permeating and diffusing into the resin, whereby the surface characteristics can be maintained for a long term.

Moreover, the slip improving agent, needless to say, is preferably nonvolatile, and one having such a vapor pressure as not to volatilize even during container molding or during exposure of the container to the atmosphere is used preferably.

Examples of the slip improving agent preferably used in the present invention include silicone oil, glycerin fatty acid ester, liquid paraffin, and edible oils and fats. Particularly preferred are glycerin fatty acid esters typified by medium chain fatty acid triglyceride, glycerin trioleate, and glycerin diacetomonooleate; and liquid paraffin. These slip improving agents may be used as mixtures. They volatilize with difficulty, and they are approved as food additives. Furthermore, they are advantageous in that they are odorless and do not impair the flavor of the contents.

The coating amount of the lubricating layer formed by coating with the above slip improving agent is preferably 0.2 to 50 g/m² at room temperature (23° C.). The coating amount less than this value will make it difficult to ensure satisfactory slip properties on the inner surface of the container. The coating amount larger than this value will cause liquid dripping, or will influence the characteristics of the contents.

When the lubricating layer is formed from the liquid slip improving agent on the surface of the underlying resin layer, the coverage factor F of the lubricating layer is represented by the following Equation (1):

$$F=(\cos\theta-\cos\theta_B)/(\cos\theta_A-\cos\theta_B) \quad (1)$$

where $\theta$: Water contact angle on the surface of the underlying resin layer (resin layer permeated with the slip improving agent), $\theta_A$: Water contact angle on the lubricating layer, and $\theta_B$: Water contact angle on the underlying resin (free of the slip improving agent).

In the present invention, the coverage factor F is 1.0, showing that the lubricating layer can be formed throughout the underlying resin layer forming the inner surface of the container.

The cloud point herein refers to a temperature at which paraffin and other solids begin to precipitate and separate when a sample is cooled, without stirring, by a prescribed method. Its measurement complies with JIS K2269 (methods for testing of flow points of crude oil and petroleum products and cloud points of petroleum products).

3. Fluid Contents

In the package of the present invention, the contents to be accommodated in the container are a fluid substance and, as long as they exhibit fluidity without showing shape retention properties, they are not particularly limited. Generally, however, the preferred contents are viscous pasty or slurry fluid substances (e.g., those having a viscosity at 25° C. of 100 cps or more). Their examples are ketchup, water-based glue, honey, various sauces, mayonnaise, yogurt, cosmetic liquids such as emulsions, liquid detergents, shampoos, and rinses. Also preferred are contents comprising mixtures of liquids and solids or gelled substances, typified by Chinese dishes called mabo tofu and *Qingjiao rousi* (green pepper steak), shrimps in chili sauce, and curry. The container used in the package of the present invention shows satisfactory slip properties. Thus, even for such contents being viscous fluid substances or mixtures of liquids and solids or gelled substances, the container when tilted or inverted enables the contents to be discharged promptly without adhering to or remaining on the inner surface of the container.

The package of the present invention shows high slipperiness with respect to particularly highly viscous contents among the above-mentioned ones, and exhibits such properties that the contents slide on the inner surface of the container and fall off in a short time (a high fall speed). For low viscosity contents, the package shows the property of allowing the contents to fall off cleanly without leaving them on the inner surface of the container.

4. Additive:

According to the above uses of the package, the resin layer forming the inner surface of the container used in the package may incorporate various additives publicly known per se, for example, antioxidants, ultraviolet absorbers, and fillers, and may also incorporate lubricants typified by fatty acid amides, and anti-blocking agents typified by silica. For uses not requiring transparency, moreover, colorants such as pigments or dyes may be incorporated. Furthermore, crystalline additives (inorganic oxides such as titanium oxide and various waxes) can also be incorporated.

The amounts of such additives incorporated, however, should be small amounts such that the coating amount of the lubricating layer is maintained in the aforementioned range, moldability is not impaired, and the slipperiness of the inner surface of the container is not impaired.

5. Layered Structure of the Container:

With the container used in the package of the present invention, its layered structure is not limited, as long as the lubricating layer resulting from the above-mentioned slip improving agent is formed on the inner surface of the container.

For example, such a container may have a single layer structure derived from the inner surface resin alone, and the lubricating layer of the slip improving agent may be formed on the inner surface of the container having such a single layer structure. If the slip improving agent in an amount equal to or larger than the saturated content of the slip improving agent that the layer of the inner surface resin has is applied as a coating and placed for a long time at room temperature, however, the diffusion/permeation of the slip improving agent into the resin layer proceeds, and the slip improving agent oozes out onto the outer surface and becomes sticky. Thus, the single-layered resin must be thickened, or the coating amount must be restricted. In order to suppress the oozing out onto the outer surface, therefore, it is preferred to use the container of a multilayer structure.

In the bag-shaped container having a two-layer structure composed of an inner layer film and an outer layer film, the slip improving agent is accumulated between the films, and the diffusion/permeation into the outer layer film can be delayed. Thus, the work efficiency of waste disposal after discharge of the fluid contents is high.

Herein, the saturated impregnation amount of the resin layer for the slip improving agent refers to a maximum amount in which the resin layer can absorb the liquid slip improving agent, and differs according to the type of the slip improving agent or the resin. The saturated impregnation amount is determined as follows: A sample obtained by heat-mixing the resin layer and the slip improving agent is allowed to stand for a certain period of time, and the point at which the coverage factor F reaches its peak is measured. The amount of the slip improving agent added is gradually increased, and the amount in which the maximum coverage factor does not change any more is taken as the saturated impregnation amount.

The container used in the package of the present invention can take a structure in which the inner surface resin is coated on glass, metal or paper to form the underlying resin layer, and can also assume a multilayer structure comprising the underlying resin layer and other resin layer(s) stacked. Anyway, it suffices that the lubricating layer of the slip improving agent be formed on the inner surface.

The inner surface of the container, which underlies the lubricating layer, is not limited to a resin, but may be a metal, paper, or glass.

The above multilayer structure can be exemplified by a structure in which an oxygen barrier layer or an oxygen absorber layer is stacked, as appropriate via a layer of an adhesive resin, on a surface of the resin layer underlying the lubricating layer on a side opposite to the underlying surface of the resin layer, and a resin of the same type as the underlying resin is further stacked on the oxygen barrier or absorber layer.

The oxygen barrier layer in the multilayer structure is formed, for example, from an oxygen barrier resin such as an ethylene-vinyl alcohol copolymer or a polyamide and, unless its oxygen barrier properties are impaired, other thermoplastic resin may be blended with the oxygen barrier resin.

The oxygen absorber layer is a layer containing a polymer that can be oxidized and a transition metal-based catalyst, as described in JP-A-2002-240813. This layer has the polymer that can be oxidized by the action of the transition metal-based catalyst, thereby absorbing oxygen to block passage of oxygen. Since the polymer and the transition metal-based catalyst are described in detail in the above JP-A-2002-240813, their details are omitted herein. Typical examples of the polymer that can be oxidized include olefin resins having a tertiary carbon atom (e.g., polypropylene, polybutene-1 or the like, or copolymers thereof), thermoplastic polyesters, aliphatic polyamides, xylylene group-containing polyamide resins, and ethylenically unsaturated group-containing polymers (e.g., polymers derived from polyene, such as butadiene). Typical examples of the transition metal-based catalyst are inorganic salts, organic acid salts, or complex salts of transition metals such as iron, cobalt and nickel.

The adhesive resin used for adhesion of the respective layers is publicly known per se. For example, olefin resins graft-modified with carboxylic acids, such as maleic acid, itaconic acid, and fumaric acid, or anhydrides, amides, or esters thereof; ethylene-acrylic acid copolymer; ionically crosslinked olefin copolymers; and ethylene-vinyl acetate copolymer are used as the adhesive resin.

The thicknesses of the above-mentioned respective layers may be set at suitable values in accordance with the characteristics required of these layers.

In addition, a regrind layer comprising a blend of a scrap, such as burr generated during molding of the above structural body of a multilayer structure, and a virgin resin such as an olefin resin can be provided as an internal layer.

6. Shape of the Container

The container used in the package of the present invention can be of various shapes and, for example, may have a shape conformed to uses, such as that of a cup or a drinking glass, a bottle, a bag (pouch), a syringe, a pot, or a tray. The container may be a stretch-molded one.

Particularly because the selection of the slip improving agent forming the lubricating layer can improve slipperiness with respect to viscous fluid contents, it is most preferred for the container to have the shape of a bottle accommodating such contents.

To produce such a container, a preform having the aforementioned inner surface is molded by a method publicly known per se. The preform is subjected to sticking of a film by heat sealing, vacuum forming such as plug-assist forming, and post-processing such as blow molding to form a container. As has been briefly mentioned earlier, moreover, the slip improving agent in the form of a liquid under a coating environment or a service temperature environment is applied to the underlying surface of the inner surface by coating using a spray, a roller, a knife or a spin coater according to the shape of the container. By so doing, the container can be formed in a shape having the lubricating layer from the slip improving agent on the inner surface.

Also, the container may have the inner surface coated beforehand with the slip improving agent, or may be filled with the contents and the slip improving agent simultaneously to form the lubricating layer on the inner surface of the container. A layer of the slip improving agent formed on the inner surface can be formed as the lubricating layer with a predetermined thickness by cooling to a predetermined temperature, without being absorbed to the underlying resin or migrating into the contents. Cooling of the layer of the slip improving agent may be performed from the interior of the container, from its exterior, or from the contents. The step of placing the contents within the container may be carried out when the lubricating layer is in a liquid state or in a solid state. If the lubricating layer is a liquid layer, liquid dripping occurs depending on the storage status of an empty container, but liquid dripping can be suppressed by coating the slip improving agent and filling the contents immediately. Even for the contents to be filled at a temperature higher than 30° C.+the cloud point of the slip improving agent, unevenness in the thickness of the lubricating layer due to the cooling time can be suppressed. Cooling may be performed before or after the contents are sealed up.

FIG. 1 shows a direct blow bottle which is the most preferred shape of the container for use in the package of the present invention.

That is, this bottle indicated entirely at 10 has a threaded neck 11, a barrel wall 15 connected to the neck 11 via a shoulder 13, and a bottom wall 17 closing the lower end of the barrel wall 15 as shown in FIG. 1. The aforementioned lubricating layer is formed on the inner surface of the bottle 10 described above, and viscous contents are filled into the bottle 10.

<Use of the Package>

The package of the present invention having fluid contents accommodated in the above container is stored for a certain period under a low temperature storage environment at 10° C. or lower. In particular, the storage temperature on this occasion, as stated earlier, is set according to the type of the slip improving agent forming the lubricating layer, so as to satisfy the following condition:

$$t<c+30,$$

especially, $t<c$ where t is the storage environment temperature (° C.) of the package, and c is the cloud point (° C.) of the slip improving agent. By so doing, the disappearance over time of the lubricating layer during storage can be effectively avoided.

In withdrawing the contents from the package (container), the package is taken out from under the above low temperature storage environment, and then the package is heated at a temperature equal to or higher than the cloud point of the slip improving agent, particularly preferably, so as to satisfy the following equation:

$$c+5<T<100$$

where c is the cloud point (° C.) of the slip improving agent, and

T is the heating temperature (° C.) at the time of withdrawing the contents.

By this measure, the mobility of the molecule of the slip improving agent forming the lubricating layer is enhanced, excellent slip improvement ascribed to the lubricating layer is exhibited, and discharge of the contents by tilting or the like of the container can be performed quickly.

EXAMPLES

Various methods of measurement used in the following experiments are as follows:

1. Measurement of the Crystalline Melting Point of the Slip Improving Agent

Using Diamond DSC (manufactured by PerkinElmer), differential scanning calorimetry of the slip improving agent to be used as described later was conducted. The temperature was raised at a rate of 10° C./min from −50° C. to 30° C. In the resulting profile, the temperature of an endothermic peak was taken as the melting point of the crystal formed in the slip improving agent.

2. Measurement of the Coverage Factor of the Lubricating Layer

For measurement, a solid-liquid interface analysis system DropMaster700 (manufactured by Kyowa Interface Science Co., Ltd.) was used under the conditions: 23° C. and 50% RH. A film prepared by a method to be described later was fixed to a test bench, with its surface formed with the lubricating layer facing upward. 3 μL of deionized water was placed on the film, and the water contact angle θ was measured immediately after preparation, and at 1 day, 2 days, 6 days and 7 days. Using each of the water contact angles obtained, the coverage factor of the lubricating layer on the inner surface of the bottle was calculated from the following equation (1):

$$F=(\cos\theta-\cos\theta_B)/(\cos\theta_A-\cos\theta_B) \quad (1)$$

where

θ is the water contact angle measured at atmospheric pressure in connection with the surface of the film prepared by the method described later on which the lubricating layer was formed, $\theta_A$ is the water contact angle measured at atmospheric pressure in connection with the slip improving agent (oily liquid) forming the lubricating layer, and $\theta_B$ is the water contact angle measured at atmospheric pressure in connection with the film supporting the lubricating layer.

In finding the coverage factor F of the lubricating layer, the following values of the water contact angle were used as the values of $\theta_A$ and $\theta_B$:

$\theta_A$: 80.3° (value on a liquid film of medium chain fatty acid triglyceride).

$\theta_B$: Value of the water contact angle measured using the film before formation of the lubricating layer.

3. Adhesion Test

The contents weighing about 2 g were placed at room temperature (20° C.) on a surface of the film prepared by the method described later, the surface where a liquid film (lubricating layer) was formed. The adhesion of the contents when the film was tilted was evaluated visually. When the contents did not adhere to the surface, ⊚ was assigned. When the contents adhered to the surface, X was assigned.

The contents used are shown below. As the viscosity of the contents, a value measured at 25° C. using a tuning fork vibration viscometer SV-10 (manufactured by A&D Company, Limited) was indicated.

Contents Used:

Ketchup

Tomato ketchup produced by KAGOME CO., Ltd.

Viscosity=1050 mPa·s

Sauce

Okonomi Sauce produced by OTAFUKU SAUCE Co., Ltd.

Viccosity=560 mPa·s

4. Slip-Down Test

About 1 g of glycerin (viscosity=1400 mPa·s, surface tension=63.4 mN/m) was placed on a surface of the film prepared by the method described later, the surface where a liquid film was formed, and the resulting sample was allowed to stand for a certain time at each of temperatures. After the temperature stabilized, the film was tilted under a predetermined temperature environment, and the slip-down properties of glycerin were evaluated visually. ⊙ was assigned when glycerin easily slipped down, ○ was assigned when glycerin slipped down though at a slow speed, and X was assigned when glycerin did not slip down.

Example 1

The following liquid was provided as the slip improving agent:

Medium Chain Fatty Acid Triglyceride (MCT)

Surface tension: 28.8 mN/m

Viscosity: 33.8 mPa·s

Cloud point: −6 to −7° C.

Figure 2:
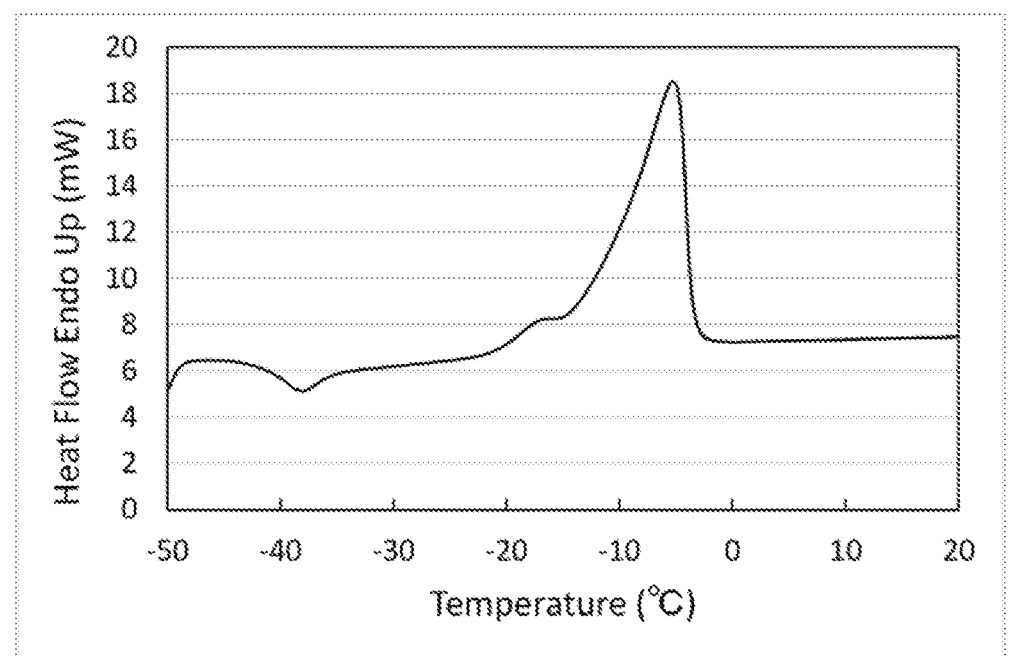
FIG. 2 is a view showing the temperature rise profile, as measured by differential scanning calorimetry, of a slip improving agent used in the Examples. In this example, an endothermic peak is confirmed at −5° C., showing that a part of the component of the slip improving agent crystallizes at a temperature of −5° C. or lower. Based on this measurement as well, the slip improving agent is found to have a cloud point of −5° C. or lower.

The crystalline melting point of the MCT was −5° C. according to differential scanning calorimetry. The results of the differential scanning calorimetry are shown in FIG. 2.

Using LABO PLASTOMILL, low density polyethylene (LDPE) was fed as a resin to extruders A and B, and extruded from a ring die head at a temperature of 210° C. to prepare a cylindrical two-layer film having an inner layer and an outer layer both composed of LDPE. The thickness of the film was measured microscopically and found to be about 60 μm internally and about 70 μm externally, totaling about 130 μm.

A fragment measuring 120 mm×120 mm was cut out from the resulting LDPE film, and mounted on a rotating table of a spin coater (MS-A200, manufactured by MIKASA CO., LTD.).

The sample was coated with the above MCT (slip improving agent) by the spin coater (coating conditions: 5000 rpm, 600 sec) and, immediately after coating, was stored at a temperature of −20° C. The coating amount of MCT was calculated from the weight change of the film (i.e., comparison between the weights of the film before and after coating with MCT). Using the film prepared, measurements of the MCT coverage factor immediately after preparation, 1 day after preparation, and 2 days after preparation were made. The adhesion test 2 days after preparation was also conducted. The results are shown in Table 1.

Example 2

A film was prepared in the same way as in Example 1, except that the storage temperature was set at 5° C. Measurements of the MCT coverage factor immediately after preparation, 1 day after preparation, and 2 days after preparation were made. The adhesion test 2 days after preparation was also conducted. The results are shown in Table 1.

Comparative Example 1

A film was prepared in the same way as in Example 1, except that the storage temperature was set at 22° C. Measurements of the MCT coverage factor immediately after preparation, 1 day after preparation, and 2 days after preparation were made. The adhesion test 2 days after preparation was also conducted. The results are shown in Table 1.

Example 3

A film was prepared in the same way as in Example 1, except that the coating conditions using the spin coater were 5000 rpm and 60 sec. Measurements of the MCT coverage factor immediately after preparation, 6 days after preparation, and 7 days after preparation were made. The adhesion test 7 days after preparation was also conducted. The results are shown in Table 1.

Example 4

A film was prepared in the same way as in Example 3, except that the storage temperature was set at 5° C. Measurements of the MCT coverage factor immediately after preparation, 6 days after preparation, and 7 days after preparation were made. The adhesion test 7 days after preparation was also conducted. The results are shown in Table 1.

Comparative Example 2

A film was prepared in the same way as in Example 3, except that the storage temperature was set at 22° C. Measurements of the MCT coverage factor immediately after preparation, 6 days after preparation, and 7 days after preparation were made. The adhesion test 7 days after preparation was also conducted. The results are shown in Table 1.

Furthermore, the results of the adhesion test in Table 1 show that the storage at −20° C. and 5° C. was able to maintain the characteristics of the film surface.

Based on the above results, storage under a low temperature environment is able to prevent the slip improving agent (MCT) from permeating and diffusing into the resin and enables the surface characteristics to be exhibited stably for a long term.

Example 5

Using low density polyethylene (LDPE), a plate 1 mm thick and 5.8 cm square was prepared by an injection

TABLE 1

| | Underlying resin | Liquid | Liquid film Cloud point [° C.] | Coating amount [g/m²] | Storage conditions Temperature [° C.] | Coverage factor [%] | | | | | Adhesion test | |
|---|---|---|---|---|---|---|---|---|---|---|---|---|
| | | | | | | Day 0 | Day 1 | Day 2 | Day 6 | Day 7 | Ketchup | Sauce |
| Ex. 1 | LDPE | MCT | −6 to −7 | 0.29 | −20 | 91 | 91 | 91 | — | — | ◎ | ◎ |
| Ex. 2 | LDPE | MCT | −6 to −7 | 0.36 | 5 | 93 | 92 | 93 | — | — | ◎ | ◎ |
| Comp. Ex. 1 | LDPE | MCT | −6 to −7 | 0.41 | 22 | 93 | 30 | 5 | — | — | X | X |
| Ex. 3 | LDPE | MCT | −6 to −7 | 0.96 | −20 | 91 | — | — | 91 | 92 | ◎ | ◎ |
| Ex. 4 | LDPE | MCT | −6 to −7 | 1.04 | 5 | 91 | — | — | 93 | 92 | ◎ | ◎ |
| Comp. Ex. 2 | LDPE | MCT | −6 to −7 | 0.96 | 22 | 86 | — | — | 88 | 54 | X | X |

Figure 3:
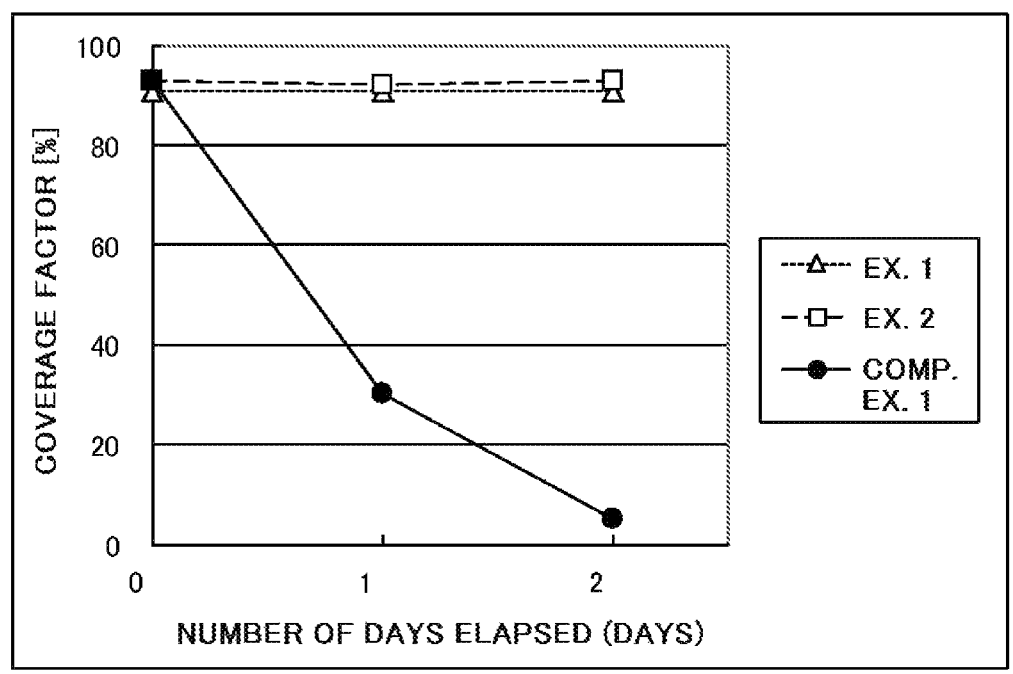
FIG. 3 is a view showing changes over time in the coverage factor of the slip improving agent applied in a coating amount of 0.5 g/m$^2$ or less, with the storage temperature of the package being set at −20° C., 5° C., or 22° C.

FIG. 3 shows changes over time in the MCT coverage factor (lubricating layer coverage factor) when the coating amount of the slip improving agent (MCT) was 0.5 g/m² or less, and the storage temperature was set at −20° C., 5° C. and 22° C.

When the sample was stored at 22° C. (Comparative Example 1), the liquid coverage factor began to decrease immediately after coating with the liquid. The coverage factor was 90% or more initially, but decreased to 5% after a lapse of 2 days, probably because the liquid film permeated and diffused into the resin. When the sample was stored at −20° C. and 5° C., on the other hand, the liquid coverage factor was almost unchanged at each temperature, and a liquid coverage factor as high as 90% or more was maintained even at 2 days.

Figure 4:
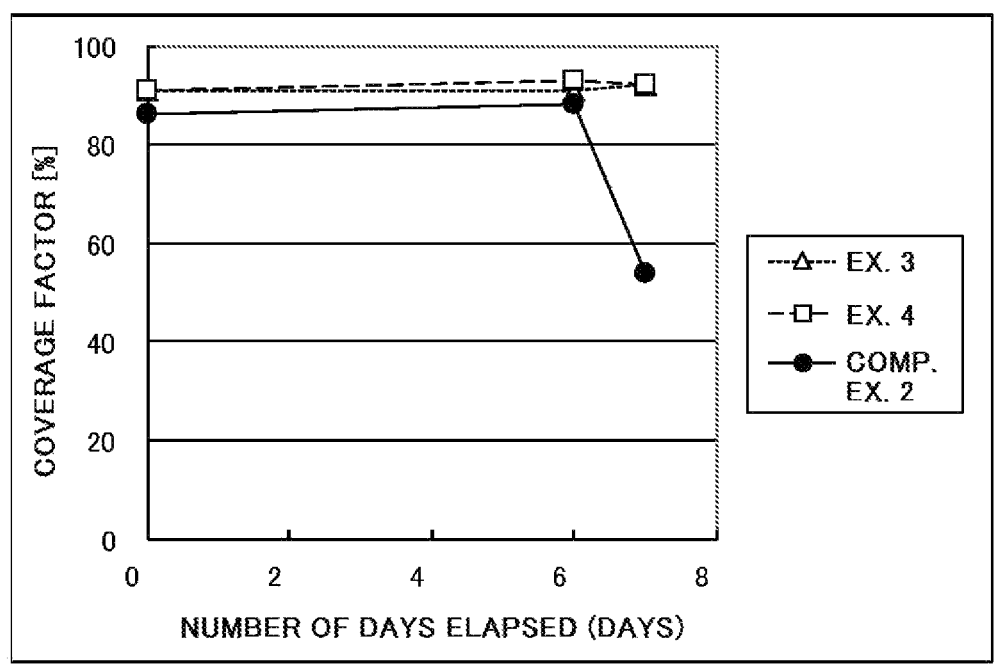
FIG. 4 is a view showing changes over time in the coverage factor of the slip improving agent applied in a coating amount of 0.5 g/m$^2$ or more, with the storage temperature of the package being set at −20° C., 5° C., or 22° C.

Even when MCT was applied as a thick film (coating amount of MCT was 0.5 g/m² or more), similar storage at 22° C. decreased the coverage factor at 7 days, probably because of permeation and diffusion of MCT into the resin. Storage at −20° C. and 5° C., on the other hand, was found to maintain the coverage factor at a high level even at 7 days (see FIG. 4).

molding machine. A surface of the resulting LDPE plate was coated with the above MCT (slip improving agent) by dipping, and the coated plate was allowed to stand until excess MCT dropped off. The coating amount of MCT was calculated from the weight change of the film (i.e., comparison between the weights of the film before and after coating with MCT). Using the film prepared, slip-down test at 5° C. was conducted. The results are shown in Table 2.

Example 6

A plate was prepared and subjected to a slid-down test in the same manner as in Example 5, except that the slip-down test temperature was set at 0° C. The results are shown in Table 2.

Comparative Example 3

A plate was prepared and subjected to a slid-down test in the same manner as in Example 5, except that the slip-down test temperature was set at −15° C. The results are shown in Table 2.

TABLE 2

| | Underlying resin | liquid | Liquid film Cloud point [° C.] | Coating amount [g/m²] | Slip-down test conditions Temperature [° C.] | Slip-down test |
|---|---|---|---|---|---|---|
| Example 5 | LDPE | MCT | −6 to −7 | 3.0 | 5 | ◎ |
| Example 6 | LDPE | MCT | −6 to −7 | 3.0 | 0 | ○ |
| Comparative Example 3 | LDPE | MCT | −6 to −7 | 3.0 | −15 | X |

When the slip-down test was conducted at −15° C. (Comparative Example 3), the slip improving agent did not function, and the contents remained adhered, because the environment temperature was lower than the cloud point.

When the slip-down test was conducted at 0° C. or 5° C., by contrast, the slip-down properties were satisfactory, because the environment temperature in each case was higher than the cloud point. In view of these findings, when the contents are withdrawn, discharge of the contents can be performed promptly by heating to a temperature higher than the cloud point of the slip improving agent.

Explanations of Letters or Numerals

10: Direct blow bottle
11: Neck
13: Shoulder
15: Barrel wall
17: Bottom wall
19: Metal foil
20: Cap

The invention claimed is:

1. A package comprising a container that contains a liquid content and is stored in a low-temperature environment, wherein:

said container is formed of a single layer of an olefin resin, and contains a slip improving agent;

said slip improving agent has a cloud point of −20° C. to 10° C., an amount of said slip improving agent contained in the container being not less than a saturated impregnation amount of said slip improving agent in the layer of said olefin resin, at least part of said slip improving agent forming a lubrication layer on an inner surface of said container; and the temperature t° C. of the environment in which said package is stored is not higher than −15° C. under the condition that the following formula, $$t<c$$

wherein c is the cloud point of the slip improving agent, is satisfied.

2. The package according to claim 1, wherein the lubrication layer has a coating amount of 0.2 to 50 g/m$^2$ at room temperature (23° C.).

3. The package according to claim 1, wherein the resin forming the inner surface of the container is formed from an olefin resin having a glass transition point (Tg) of 0° C. or lower.

4. A method for using a package for low temperature storage, comprising:

storing the package for low temperature storage according to claim 1 under the low temperature storage environment at a temperature t° C. of not higher than −15° C. for a certain period;

then withdrawing the package from under the low temperature storage environment;

then heating the package to a temperature equal to or higher than the cloud point of the slip improving agent; and then discharging the fluid contents from inside the package.

5. The method for using a package for low temperature storage according to claim 4, which comprises storing the package for low temperature storage under the low temperature storage environment at a temperature t° C. of not higher than −15° C. under the condition that the following formula, $$t<c$$

wherein c is the cloud point of the slip improving agent, is satisfied.

* * * * *